United States Patent [19]
Will

[11] 3,785,224
[45] Jan. 15, 1974

[54] ELECTROHYDRAULIC TRANSMISSION SHIFTING APPARATUS FOR A MOTOR CAR

[75] Inventor: Gerhard Will, Beutelsbach, Germany

[73] Assignee: Robert Bosch GmbH, Stuttgart, Germany

[22] Filed: Sept. 13, 1972

[21] Appl. No.: 288,654

[30] Foreign Application Priority Data
Sept. 13, 1971 Germany.................. P 21 45 666.6

[52] U.S. Cl................... 74/865, 74/867, 74/869, 74/752 A
[51] Int. Cl................... B60k 21/00, F16h 3/74
[58] Field of Search.................. 74/765, 767, 763, 74/752 A

[56] References Cited
UNITED STATES PATENTS
3,487,725  1/1970  Brunot.......................... 74/752 A 3,727,487  4/1973  Forster et al. ..................... 74/865

Primary Examiner—Arthur I. McKeon
Attorney—Michael S. Striker

[57] ABSTRACT

An electrohydraulic transmission shifting apparatus includes an electrohydraulic transducer with a throttle valve operated by an electromagnet and a pressure-limiting valve which effects a kick-down signal at a predetermined maximum pressure when the gas pedal is fully depressed. Fluid under pressure is supplied from a pump to the valves. A fluid-pressure control flow, limited by the pressure-limiting valve, is supplied to a main valve connecting a pump with the shifting means of a transmission so that the valve operates in accordance with the control flow. The pump is also connected with the kick-down shifting means of the transmission by a kick-down valve when the electrohydraulic transducer is operated upon a kick-down gas pedal operation.

14 Claims, 6 Drawing Figures

3,785,224

ELECTROHYDRAULIC TRANSMISSION SHIFTING APPARATUS FOR A MOTOR CAR

BACKGROUND OF THE INVENTION

The present invention relates to an electrohydraulic transmission shifting apparatus for motor cars which has at each speed stage, several hydraulic shifting means, and which is provided with a fluid-controlled main valve which regulates the shifting pressure.

An automatic transmission shifting apparatus is known in which the transmission is shifted to the several speeds by a hydraulic auxiliary force. The pressure fluid is supplied to the respective hydraulic shifting means by a controlled valve, and the shifting pressure is set by a fluid-controlled main valve. The control flow controlling the main flow of the main valve from a pump, is regulated by a throttle valve which is controlled by a membrane operated by the vacuum in the suction pipes of the combustion engine. In order to shift back during passing of another moving vehicle at high speed and great acceleration, a kick-down valve is provided which is mechanically connected with the gas pedal of the motor car so that when the driver of the car floors the gas pedal, the kick-down valve permits the flow of pressure medium to the shifting means of the transmission which shifts the transmission back to the next-lower speed.

In the above-described electrohydraulic apparatus electrohydraulic transducers are used, but the selection of the speeds is hydraulically effected, a mechanically operated kick-down valve is required, which is connected by a Bowden cable, or by a linkage, with the gas pedal. The arrangement is expensive, and requires very accurate assembly.

SUMMARY OF THE INVENTION

It is one object of the invention to provide an electrohydraulic transmission shifting apparatus which does not require a linkage or a Bowden cable.

Another object of the invention is to provide an automatic transmission shifting apparatus in which an electrohydraulic transducer, controlled by electronic control means, automatically effects a down-shift of the transmission upon full depression of the gas pedal.

With these objects in view, the present invention provides an electrohydraulic transducer which, when the control pressure of the main valve has been limited to a predetermined maximum, effects a kick-down signal to the kick-down shifting means of the automatic transmission.

The arrangement has the advantage that the pressure acting on the shifting means of the transmission, is not increased during a kick-down acceleration operation, so that gear-shifting is facilitated. Furthermore, the start of a kick-down operation upon reaching full load, is prevented.

The novel features which are considered as characteristic for the invention are set forth in particular in the appended claims. The invention itself, however, both as to its construction and its method of operation, together with additional advantages and objects thereof, will best be understood from the following description of specific embodiments when read in connection with the accompanying drawing.

DESCRIPTION OF THE PREFERRED EMBODIMENTS

Figure 1:
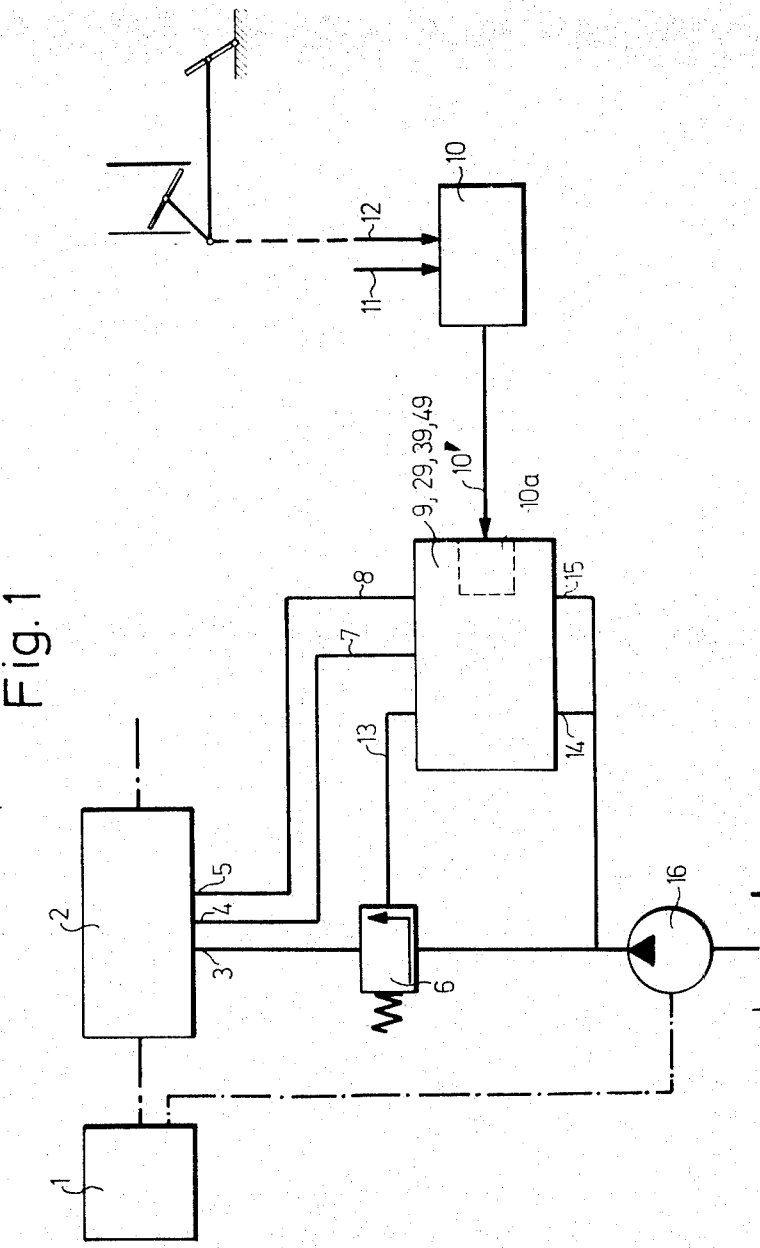
FIG. 1 is a schematic diagram illustrating an electrohydraulic transmission shifting apparatus according to the invention applied to a combustion engine or motor, and including an electrohydraulic control apparatus schematically shown in FIG. 1.
Figure 1A:
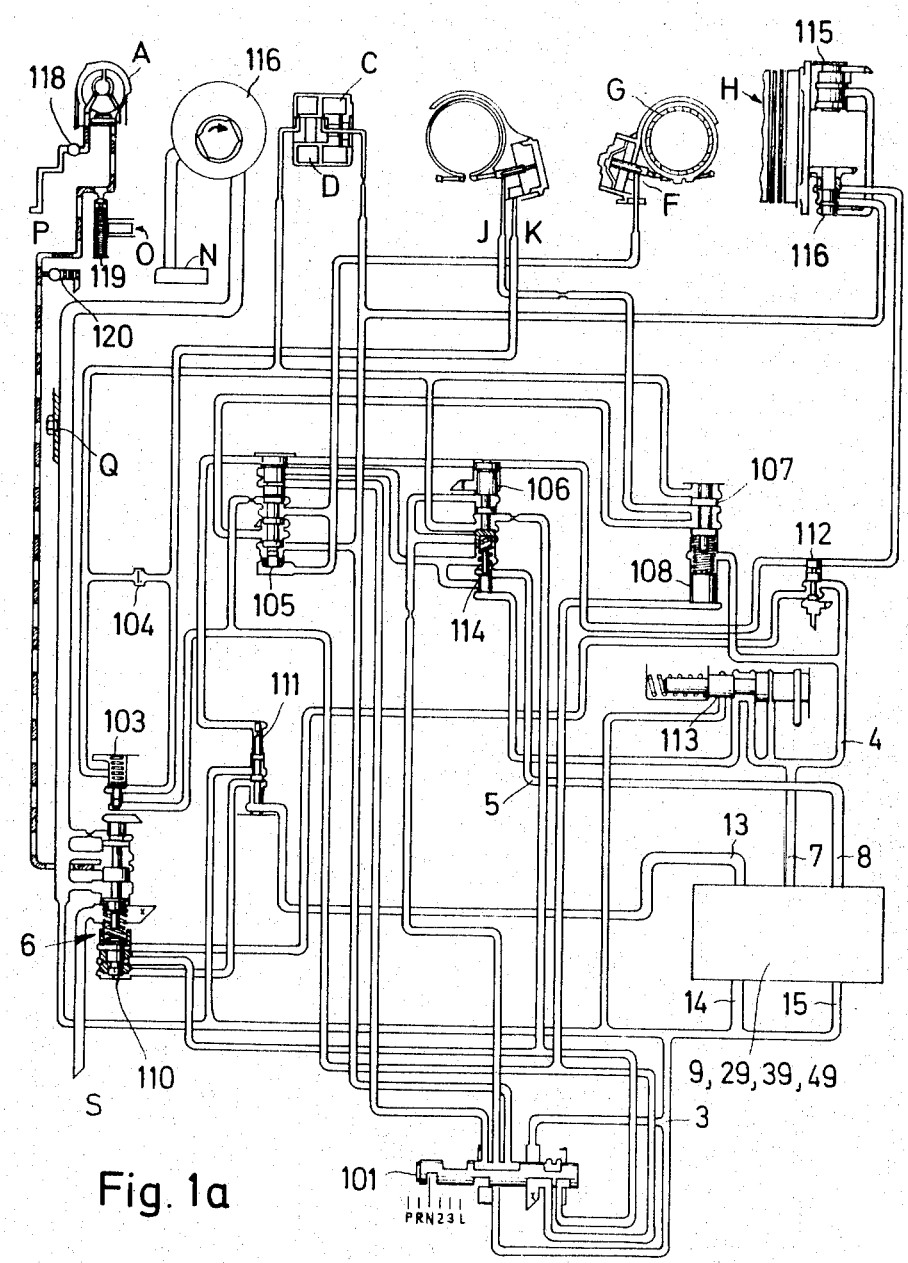
FIG. 1a is a schematic view substantially corresponding to FIG. 1, but showing details of the transmission.

Referring first to FIG. 1, the drive motor 1, which is a combustion engine, has a shaft connected with an automatic transmission 2, parts of which are shown in detail in FIG. 1a. Transmission 2 can be shifted between several speeds by hydraulically operated shifting means, including clutches C, D and brakes E, F, as shown in FIG. 1a, for shifting the transmission to different speeds.

The transmission 2 has three hydraulic inlets 3, 4 and 5. A servo main valve 6 connects a pump 16 with the inlet 3 for supplying the shifting pressure. The second inlet 4 is provided for fluid pulses which bring about a gear-shift operation, and the third inlet 5 is provided for a fluid kick-down signal. A hydraulic control apparatus 9 is shown in FIGS. 1 and 1a as a box, and illustrated in detail in FIGS. 2, 3, 4 and 5 which show different embodiments 9, 29, 39, and 49. The inlets 4 and 5 of the transmission 2 are connected with the outlet 7 for the shift signal, and with the outlet 8 for the kick-down signal. The outlet 13 is connected with the servo main valve 6 and controls the main flow through main valve 6 from pump 16 to inlet 3 of transmission 2.

The electrohydraulic control apparatus 9 also has two inlets 14 and 15 which are both connected with the pump 16 so that pressure fluid is supplied to the electrohydraulic control apparatus.

The hydraulic control apparatuses 9, 29, 39 and 49 will be described in detail with reference to FIGS. 2–5. However, it should be noted that each electrohydraulic control apparatus comprises a pressure-limiting valve, and an electrohydraulic transducer including a valve, and an electromagnet for operating the valve. The magnet 10a, see FIG. 2 for example, of the electrohydraulic control apparatus 9, is connected by conductors 10' with an electronic control means 10 which has a first input 11 for receiving a signal representing the speed and number of revolutions of the shaft of motor 1 and of the input shaft of the transmission 2, and an input 12 for a signal representing the position of the gas pedal and the throttle operated by the gas pedal. The motor 1 is also operative for driving pump 16.

Referring now to the first embodiment of the electrohydraulic control apparatus 9, the outlets 13 and 7 are combined in a first outlet, and a second outlet 8 is provided for the kick-down signal. The inlets 14 and 15 are connected to pump 16 and receive pressure fluid therefrom.

A pressure-limiting valve 21 receives pressure fluid from inlet 14, and is connected with a valve portion 20a of an electrohydraulic transducer 20 which further includes an electromagnet 10a connected by conductors 10' with electronic control means 10. The valve slide 22 of the electrohydraulic transducer 20, has a kick-down valve portion 20b including a control edge which controls the flow from the inlet 15 into the outlet 8 for the kick-down signal. The valve portion 20a of the electrohydraulic transducer 20 is arranged downstream of the pressure-limiting valve 21. The valve slide 22 includes a piston having a control edge 23, permitting a communication between the pressure-limiting valve 21 and the outlet 13, 7. The cylinder of valve slide 22 has two outlets 0 discharging into a low-pressure area. Pressure-limiting valve 21 has an end chamber in which a spring 21a is located, and which discharges into a low-pressure area 0. The end face 26 of the piston 20a of valve slide 22 forms in the respective cylinder, an end chamber communicating with the outlet 13 and being therefore at the limited control pressure. The pressure in the end chamber 20c urges the valve slide 22 to the right, and when electromagnet 10a is energized, the valve slide 22 is urged to the left as viewed in FIG. 2. The shifting operation in the transmission 2 is effected in this embodiment by the control pressure flow flowing into outlet 13 which can be connected with the inlet 4 of the transmission.

The arrangement shown in FIGS. 1 and 2 operates as follows:

It is assumed that the motor car cruises along a highway without substantial acceleration for passing other cars. In this event, the transmission 2 is shifted in accordance with the torque required of the motor which is transmitted to the electronic control means 10 in the form of a torque signal, and is entered into the electrohydraulic control apparatus 9 at corresponding numbers of revolutions and speeds of the car. When a certain normal predetermined speed and number of revolutions of the motor is reached in each stage, the transmission shifts automatically to the next stage.

If the driver wants to accelerate the car for passing another car, the several transmission stages must be driven to a higher speed than the above-referred-to number of revolution, which means that the shifting must take place in each stage at a higher number of revolutions. In order to obtain such an operation, the driver floors the gas pedal moving beyond a point indicating full load. So that a different throttle position is indicated by a signal passing through input 12 into the electronic control means 10.

The electronic control means 10 generates a signal flowing through conductor 10' to the electromagnet 10a of the electrohydraulic transducer 20 which shifts the valve slide 22 in a direction corresponding to full load, requiring greater control pressures. The control edge 23 opens. At the highest required control pressure which is necessary at a full load, the pressure is limited by the pressure-limiting valve 21 to a predetermined maximum pressure at which the slide 22 assumes an end position in which at the control edge 24, a fluid kick-down signal is obtained which, by moving the shifting moment to a high speed, effects a down-shift to the next-lower speed. Since at the control edge 24 for the kick-down signal, any desired pressure can be obtained, the fluid flowing out of outlet 8 can be directly supplied to the shifting valves 105, 106 shown in FIG. 1a. An auxiliary valve for adapting the shifting pressure, is not required. The operation is carried out in a correspondingly reversed sequence after a car has been passed, and the driver releases the gas pedal. Regular shifting operations of the transmission are from then on automatically carried out.

Figure 2:
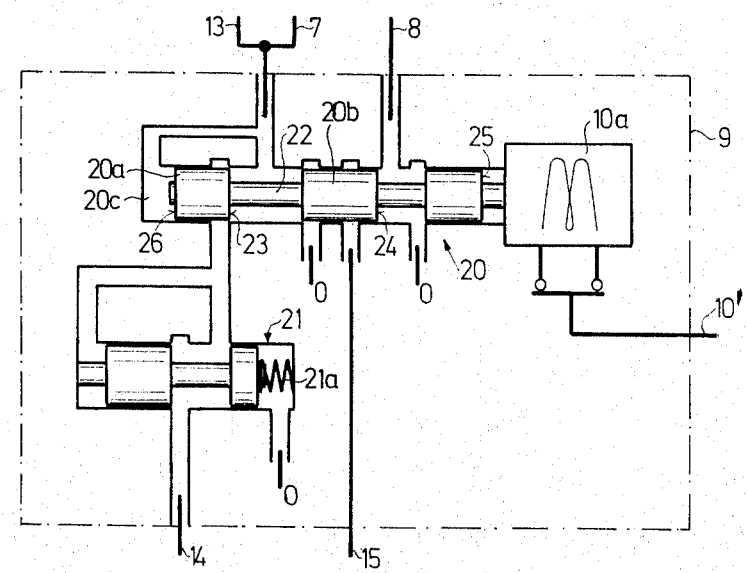
FIG. 2 is a schematic view illustrating a first embodiment of an electrohydraulic control apparatus used in the hydraulic circuits of FIGS. 1 and 1a in accordance with the invention.
Figure 3:
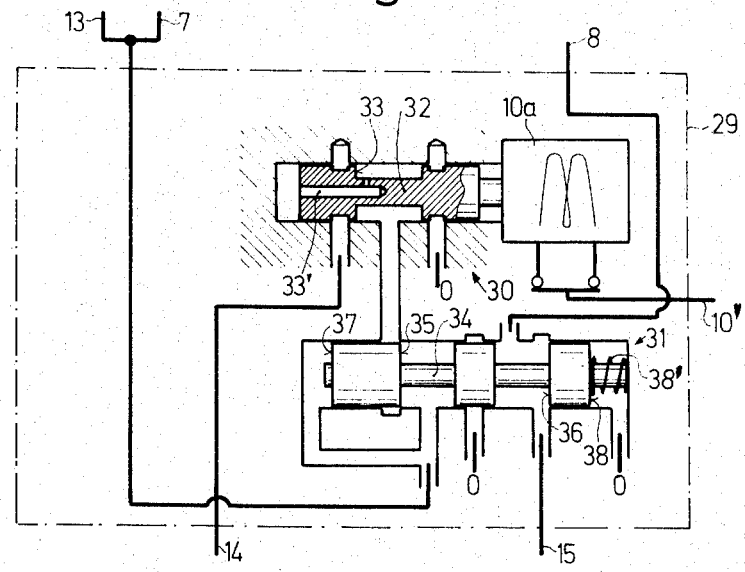
FIG. 3 is a schematic view illustrating a second embodiment of the hydraulic control apparatus.

While in the embodiment of FIG. 2, a valve part of the electrohydraulic transducer 20 is used for generating the fluid kick-down signal, in the embodiment of FIG. 3, the kick-down signal is generated by a valve part of the pressure-limiting valve 31. First and second outlets 13 and 8, and inlets 14 and 15 are again provided for the control apparatus 29. A third outlet 7 is combined with the outlet 13.

The electrohydraulic transducer 30 has a valve slide piston 32 whose control edge 33 controls the pressure fluid flow from inlet 14. The hydraulic feedback is accomplished by a central conduit 33' which communicates at one end with an end chamber at the end of the valve slide piston 32. When electromagnet 10a is energized, the valve slide piston 32 is shifted to the left, and the fluid from inlet 14 can flow through conduits 35a to the pressure-limiting valve 31 where the flow is controlled by the control edge 35. A second control edge 36 controls the fluid kick-down signal represented by the flow from inlet 15 to outlet 8. An end chamber is bounded by an end face 37, and filled with pressure fluid from outlet 13 to urge valve slide piston 34 to the left as viewed in FIG. 3, while the end chamber on the opposite sides of the valve slide piston 34 is connected with a low-pressure discharge conduit 0 but contains a spring 38' urging the valve slide piston 34 to the left as viewed in the drawing. The operation corresponds to the operation of the apparatus shown in FIG. 2, described above. When the electromagnet 10a is energized from the electronic control means 10 due to the kick-down of the gas pedal, the pressure in chamber 37a acts on valve slide piston 34 to open the passage at control edge 36 to permit flow of control fluid through outlet 8 to the kick-down shifting means in transmission 2.

The embodiment of FIG. 3 has advantages as compared with the embodiment of FIG. 2. If oscillations occur at the electrohydraulic transducer 30, no kick-down signals are produced. Furthermore, the valve slide piston 32 of the electrohydraulic transducer 30, has to make only a short stroke so that a small electromagnet can be used. The electrohydraulic transducer 30 and the pressure-limiting valve 31 can be arranged at different places in the transmission 2.

Figure 4:
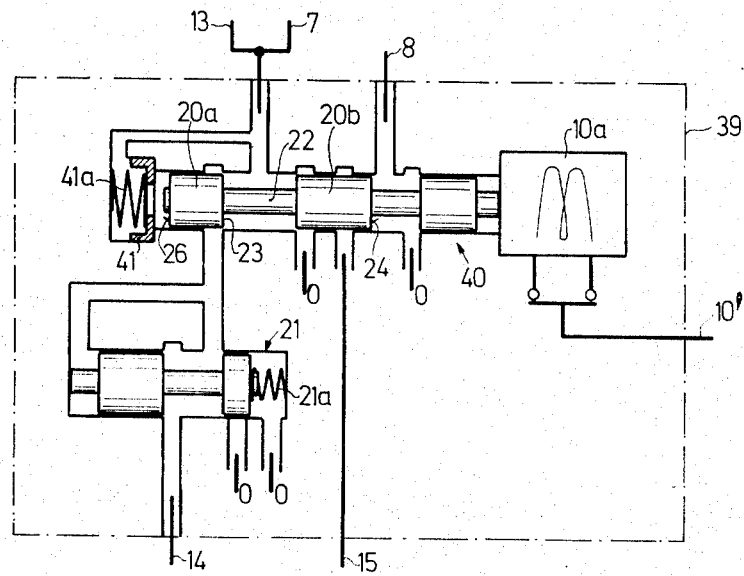
FIG. 4 is a schematic view illustrating a third embodiment of the hydraulic control apparatus.

The embodiment illustrated in FIG. 4 corresponds almost completely to the embodiment shown in FIG. 2, and like reference numerals are applied with the exception of reference numerals 39 indicating the schematically shown control apparatus.

In the embodiment of FIG. 4, an elastic stop means 41 including a spring 41a is provided in the end chamber 20c of the valve portion of the electrohydraulic transducer 40 on which the end of the valve slide piston 22 can abut with end face 26. This has the advantage that the control pressure flow provided by the electrohydraulic transducer 40, is independent of variations of the magnetic force of the electromagnet 10a under full load conditions. Such variations may be caused by the manufacturing tolerances of the electromagnet 10a, or of electronic components in electronic control means 10, or by temperature and voltage fluctuations. At full load, the pressure-limiting valve 21 is effective while the end face 26 abuts the stop 41. In order to start the kick-down operation, the electromagnet 10a must also overcome the resilient resistance of spring 41a until the valve slide piston 22 has moved so far that the kick-down signal is produced at the control edge 24 of the kick-down valve portion.

Figure 5:
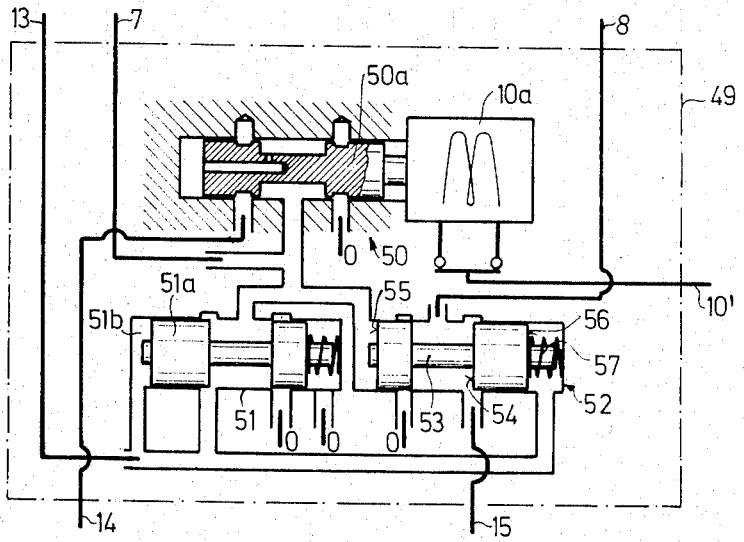
FIG. 5 is a schematic view illustrating a fourth embodiment of the hydraulic control apparatus.

In the fourth embodiment shown in FIG. 5, the kick-down signal is not produced by the electrohydraulic transducer 50, as in the embodiment of FIG. 3, but an independent kick-down valve 52 is provided in addition to the pressure-limiting valve 51.

The construction of the kick-down valve 51 is similar to the construction of the kick-down valve portion of the pressure-limiting valve shown in FIG. 3. The kick-down valve 52 limits the control pressure flow to the greatest pressure required at full load. Kick-down valve 52 includes a valve slide piston 53 slidable in a cylinder, and having a control edge 54 controlling the kick-down fluid pressure signal flowing out of outlet 8. The limited pressure from outlet 13 acts on the end face 56 of the kick-down valve slide piston 53, together with spring 57. On the end face 55, the pressure of the fluid entering through inlet 14 acts if the transducer valve slide piston 50a has been shifted by electromagnet 10a. In the pressure-limiting valve 51 the valve slide piston 51a is urged in one direction by a spring, and in the opposite direction by the pressure in the end chamber 51b corresponding to the pressure of the control fluid in outlet 13.

In the embodiment of FIG. 5 the fluid signals for operating the hydraulic shifting means of transmission 2, are provided by outlet 7 which receives pressure fluid from inlet 14 through the valve portion 50 of the electrohydraulic transducer 50. The main valve 6 is controlled, as in the other embodiments, by the control flow through outlet 13, limited by the pressure-limiting valve 51. In this arrangement, the shifting speed is maintained at the same level at full load and kick-down operation even if the control pressure is reduced by the pressure limiting valve 51. Furthermore, the arrangement operates very reliably, so that undesired kick-down signals do not occur.

FIG. 1a, which illustrates a standard automatic transmission produced by the Ford Company, provided with the control apparatus of the invention, will now be briefly described explaining the illustrated elements.

The arrangement includes a torque converter A, the oil pump 116, the forward coupling C, the rearward and direct coupling D, a band brake F for the reverse and neutral positions, an overrunning clutch G, a governor H including a primary governor valve 115 and a secondary governor valve 116, a servo piston J on the load side, a servo piston K on the relief side, an oil filter N, a torque converter input O, a torque converter input P, a checking connection Q, and an oil receptacle S.

The following regulating valves are provided:

A mechanically operated selector slide 101, a control valve 103 for the front band brake, a control valve 104 for the front servo piston, a shifting valve 105 for the first and second speeds, a shifting valve 106 for the second and third speeds, a control valve 107 for the second and third speeds, a control valve 108 for the first speed and neutral, a main valve 6, an amplifier valve 110 for the shifting pressures, an auxiliary valve 111, a by-pass valve 112, a throttling pressure amplifying valve 113, a throttle pressure equalizing valve 114, a return valve 118 for the converter outlet, a return valve 119 for the converter inlet, and a pressure control valve 120 for the converter.

It will be understood that any other automatic hydraulic transmission can be used in connection with the present invention.

It will be understood that each of the elements described above, or two or more together, may also find a useful application in other types of transmission shifting apparatuses different from the types described above.

While the invention has been illustrated and described as embodied in an electrohydraulic control apparatus including an electrohydraulic transducer and a pressure-limiting valve for producing transmission shifting signals and a kick-down signal, it will be understood that the invention is not limited to the specific details shown and that various modifications and structural changes may be made without departing in any way from the spirit of the invention.

Without further analysis, the foregoing will so fully reveal the gist of the present invention that others can by applying current knowledge readily adapt it for various purposes and applications without omitting features essential to the invention and, therefore, such modifications and adaptations are intended to be comprehended within the meaning and range of equivalence of the following claims.

What is claimed as new and desired to be protected by Letters Patent is set forth in the appended claims.

I claim:

1. Electrohydraulic transmission shifting apparatus for a motor car, comprising an automatic gear shift transmission having hydraulic shifting means including kickdown shifting means for shifting said transmission one speed down; a pump; a main valve connected between said pump and said shifting means and being responsive to a fluid pressure control flow to produce a higher shifting pressure; an electrohydraulic control apparatus including an electrohydraulic transducer and pressure limiting means, said control apparatus having inlet means connected with said pump and supplying pressure fluid from said pump to said pressure limiting means and to said electrohydraulic transducer, first outlet means connected with said main valve for supplying thereto a fluid pressure control flow limited by said pressure limiting means to a maximum control pressure, and second outlet means connected with said kickdown shifting means; and electric control means reponsive to a kickdown pedal operation to energize and operate said electrohydraulic transducer to move to a position increasing the pressure of said fluid pressure control flow until the pressure is limited to a maximum pressure by said pressure limiting means, said maximum pressure control flow operating said electrohydraulic transducer to permit flow of pressure fluid from said inlet means through said second outlet means to said kick-down shifting means as a kickdown signal for actuating said kickdown shifting means to downshift the transmission at a speed above the normal downshift speed.

2. Apparatus as claimed in claim 1, wherein said electric control means include electronic control means responsive to the speed of said transmission and to the position of the gas pedal to generate an output signal controlling said electrohydraulic transducer.

3. Apparatus as claimed in claim 1, wherein said electrohydraulic transducer includes an electromagnet, and a throttle valve having hydraulic feed back and being operated by said electromagnet.

4. Apparatus as claimed in claim 1, wherein said pressure limiting means includes a pressure limiting valve connecting said inlet means with said electrohydraulic transducer; and wherein said electrohydraulic transducer connects said inlet means with said second outlet means.

5. Apparatus as claimed in claim 1, wherein said pressure limiting means includes a pressure limiting valve connected with said first and second outlet means; and wherein said electrohydraulic transducer connects said pressure limiting valve with said inlet means.

6. Apparatus as claimed in claim 5, wherein said inlet means is connected by said pressure limiting valve with said second outlet means for supplying said kickdown signal to said kickdown shifting means.

7. Apparatus as claimed in claim 1, wherein said pressure limiting means includes a pressure limiting valve connected with said first outlet means; comprising a kickdown valve connecting said inlet means with said second outlet means, and communicating with said pressure limiting valve and said first outlet means; and wherein said electrohydraulic transducer communicates with said pressure limiting valve and said kickdown valve and is connected with said inlet means.

8. Apparatus as claimed in claim 1, wherein said electrohydraulic transducer includes a throttle valve portion for connecting said inlet means with said first outlet means, a kickdown valve portion for connecting said inlet means with said second outlet means, and electromagnetic means controlled and actuated by said electric control means to simultaneously operate said throttle valve portion and said kickdown valve portion.

9. Apparatus as claimed in claim 8, wherein said throttle valve portion and said kickdown valve portion of said electrohydraulic transducer are parts of a valve slide piston operated by said electromagnetic means, said throttle valve portion having a first control edge for regulating the flow from said inlet means to said first outlet means, and said kickdown valve portion having a second control edge for regulating the flow from said inlet means to said second outlet means; said valve slide piston having one end connected with said electromagnetic means and an other end forming an end chamber connected with said fluid pressure control flow so that said valve slide piston is moved in one direction when said electromagnetic means is energized, and is moved in the opposite direction when the pressure of said control flow increases to a maximum determined by said pressure limiting means.

10. Apparatus as claimed in claim 9, comprising a resilient stop at said other end of said valve slide piston in said end chamber for limiting movement of said valve slide piston by said electromagnetic means.

11. Apparatus as claimed in claim 1, wherein said pressure limiting valve includes a valve slide piston having a first control edge for controlling the fluid pressure control flow between said inlet means and said first outlet means to said main valve, and a second control edge for controlling the flow between said inlet means and second outlet means and to said kickdown shifting means.

12. Apparatus as claimed in claim 1, comprising a kickdown valve having a valve slide piston having a control edge for controlling the flow between said inlet means and said second outlet means, and thereby said kickdown signal, said valve slide piston having ends forming first and second end chambers, said first chamber being connected with said inlet means through said electrohydraulic transducer, and said second chamber being connected with said first outlet means and having the limited pressure of said fluid pressure control flow, and comprising a spring in said second end chamber.

13. Apparatus as claimed in claim 1, including a third outlet means connected with said hydraulic shifting means, and being connected by said electrohydraulic apparatus with said inlet means for operating said hydraulic shifting means, while said main valve receives said fluid pressure control flow limited by said pressure limiting means.

14. Apparatus as claimed in claim 1, wherein said electrohydraulic transducer includes an electromagnet controlled by said electric control means and a valve slide piston having a throttling portion with a control edge controlling the pressure fluid control flow between said inlet means and said first outlet means through said pressure limiting means, and a kickdown portion with an other control edge controlling the flow from said inlet means to said second outlet means and thereby said kickdown signal.

* * * * *